June 19, 1956   J. W. BANCROFT ET AL   2,750,800
RATE INDICATING APPARATUS FOR QUANTITY MEASUREMENTS
Filed June 13, 1951
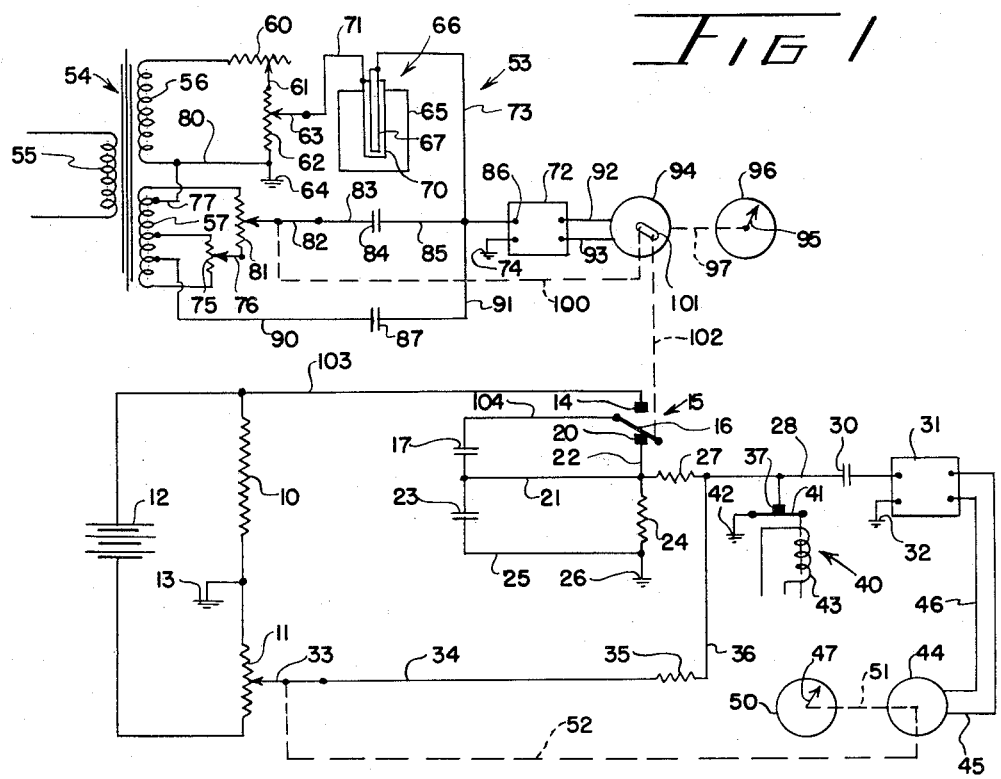
INVENTOR.
JOHN W. BANCROFT
JOHN F. STORM
BY
George H Fisher
ATTORNEY

United States Patent Office 2,750,800
Patented June 19, 1956

2,750,800

RATE INDICATING APPARATUS FOR QUANTITY MEASUREMENTS

John W. Bancroft and John F. Storm, Minneapolis, Minn., assignors to Minneapolis-Honeywell Regulator Company, Minneapolis, Minn., a corporation of Delaware Application June 13, 1951, Serial No. 231,336

3 Claims. (Cl. 73—304)

This invention is concerned with apparatus for indicating rate of change of a quantity and more particularly with apparatus for indicating the rate of change of quantity of fuel in aircraft fuel tanks. It is therefore an object of the invention to design new and improved apparatus for indicating the rate of change of the quantity of fuel in one or more fuel tanks.

Another object of the invention is to design compact and lightweight apparatus for measuring the rate of change of the quantity of fuel in one or more fuel tanks.

A further object of the invention is to design apparatus for measuring the rate of change of the quantity of fuel in one or more fuel tanks which makes maximum use of existing equipment for measuring fuel quantity and thus requires a minimum amount of additional equipment.

A further object of the invention is to design a single rate of change measuring apparatus which is capable of measuring the rate of fuel quantity change in a single tank, several tanks, or all the tanks in a craft.

A further object of the invention is to design apparatus which measures the rate of the total change in quantity of fuel and not merely the rate of consumption of fuel by the engine or engines of the craft.

A further object of the invention is to design rate indicating apparatus which is rebalancing.

A still further object of the invention is to design rate indicating apparatus more accurate than the tachometers presently known to the applicants.

Because a single apparatus may be used to indicate the rate of change of the fuel quantity in as many tanks as desired, it is possible to read the total rate of change in fuel quantity on a single indicator dial and further to reduce the additional apparatus to a minimum. By measuring the rate of change of quantity of fuel rather than merely the rate of fuel consumption all sources of fuel loss, such as evaporation and leakage, are taken into consideration. It is thus possible to more accurately estimate the time of possible flight remaining. In designing the apparatus so that it is rebalancing, the apparatus always operates about a null point and therefore is relatively insensitive to change in magnitude of supply voltages.

Further objects and advantages may be found by a study of the following detailed description taken in conjunction with the accompanying drawings, in which:

Figure 1 is a circuit diagram of the rate indicating apparatus; and

Figure 2 is a circuit diagram of a modification of the apparatus shown in Figure 1.

Generally, this rate indicating apparatus obtains a signal due to operation of the fuel quantity indicator motor, which signal is compared with a rebalancing signal to cause energization of an amplifier and operation of a rate indicating motor which also controls the amount of the rebalancing signal.

The rate indicating apparatus has a resistor 10 and a rebalancing potentiometer 11 connected in series across a source of direct voltage, shown in the Figure 1 as a battery 12. The connection between the resistor 10 and the potentiometer 11 is connected to ground terminal 13. The upper terminal of resistor 10 is connected through conductor 103 to a fixed charging contact 14 of a pulsing switch 15. A movable contact 16 of pulsing switch 15 is connected to the upper terminal of a charging capacitor 17. The lower terminal of capacitor 17 is connected to a second fixed discharging contact 20 of switch 15 through conductors 21 and 22. The lower terminal of capacitor 17 is also connected to a resistor 24.

A filter capacitor 23 is connected across resistor 24 through conductors 21 and 25. The upper terminal of resistor 24 is connected to fixed contact 20 of pulsing switch 15. The lower terminal of resistor 24 is connected to a ground terminal 26.

The upper terminal of resistor 24 is connected through a summing resistor 27, conductor 28, and a capacitor 30 to an input terminal of amplifier 31. The second input terminal of amplifier 31 is connected to ground terminal 32.

Rebalancing potentiometer 11 has a wiper arm 33 which is connected through conductor 34, summing resistor 35 and conductor 36 to conductor 28 between summing resistor 27 and capacitor 30.

A relay contact 37 of a relay 40 is connected to conductor 28 for pulsing the direct voltage on conductor 28. In addition to fixed contact 37 relay 40 has a movable contact 41, which is connected to ground terminal 42, and an energizing coil 43, which is connected to a source of alternating voltage, not shown. Relay 40 is magnetically biased by means not shown so that coil 43 is energized during operation of the apparatus to ground conductor 28 once each cycle through contacts 37 and 41.

The direct voltage from across resistor 24 and rebalancing potentiometer 11 is changed by the action of relay 40 to a pulsating direct voltage which is changed to alternating voltage upon passing through capacitor 30. Thus, the input signal to amplifier 31 is an alternating voltage signal. Amplifier 31 may be of the type shown in the Upton Patent 2,423,534 assigned to the same assignee as the present invention.

The output terminals of amplifier 31 are connected to rebalancing motor 44 through conductors 45 and 46 to cause operation of motor 44 upon energization of amplifier 31.

Motor 44 is connected to pointer 47 of rate of fuel flow indicator dial 50 through mechanical connection 51 to cause dial 50 to give an indication of the rate of change of fuel quantity. Motor 44 is further connected to wiper arm 33 of rebalancing potentiometer 11 through mechanical connection 52 to vary the signal from potentiometer 11 until it is equal in magnitude and opposite in polarity to the average of the direct voltage across resistor 24.

The manner in which the rate of pulsing of the pulsing switch is determined shall now be described.

Fuel quantity indicating apparatus 53 is energized by a transformer 54 having a primary 55 connected to a source of voltage not shown. Transformer 54 further has secondaries 56 and 57.

The upper terminal of transformer secondary 56 is connected to an empty feul quantity adjustment rheostat 60 having a wiper arm 61. Wiper arm 61 is connected to the upper terminal of an empty fuel quantity adjustment potentiometer 62 having a wiper arm 63. The lower terminal of potentiometer 62 is connected to the lower terminal of transformer secondary 56 through conductor 80 and is further connected to ground terminal 64.

A fuel tank 65 has inserted therein a capacitance tank unit 66 having an inner electrode 67 and an outer electrode 70. This tank unit is a capacitance type tank unit in which variation of fuel quantity in the tank varies the capacitance of the tank unit. Thus, the capacitance of the tank unit is an indication of the quantity of fuel in the tank.

Wiper arm 63 of empty fuel quantity adjustment potentiometer 62 is connected to outer electrode 70 of tank unit 66 through conductor 71. The inner electrode 67 of tank unit 66 is connected to an input terminal 86 of an amplifier 72 through a conductor 73. The other input terminal of amplifier 72 is connected to ground terminal 74. Amplifier 72 may be of the type shown in the Upton Patent 2,423,534, assigned to the same assignee as the present invention.

Transformer secondary 57 has a full fuel quantity adjustment potentiometer 75 having a wiper arm 76 connected across the lower portion of the secondary. A point near the upper end of transformer secondary 57 is connected to ground terminal 64 through conductors 77 and 80. A rebalancing potentiometer 81 having a wiper arm 82 is connected between the upper terminal of transformer 57 and wiper arm 76 of full fuel quantity adjustment potentiometer 75.

Wiper arm 82 of rebalancing potentiometer 81 is connected through a conductor 83 to fuel quantity rebalancing capacitor 84. The other plate of capacitor 84 is connected through conductor 85 to input terminal 86 of amplifier 72.

A capacitor 87 for balancing out the signal from tank unit 66 when tank 65 is empty has one plate connected to a point near the lower end of transformer secondary 57 through conductor 90, with the other plate of capacitor 87 being connected to input terminal 86 of amplifier 72 through conductor 91.

Amplifier 72 is connected through conductors 92 and 93 to rebalancing motor 94 for operation of motor 94 upon energization of amplifier 72. As is customary, motor 94 is a motor having a speed of rotation proportional to the energization of the motor signal winding, the energization of the line voltage winding being constant. Motor 94 is connected to a pointer 95 of a fuel quantity indicator dial 96 through mechanical connection 97 to provide an indication of the quantity of fuel in tank 65. Motor 94 is also connected to wiper arm 82 of rebalancing potentiometer 81 through mechanical connection 100 for rebalancing purposes which, of course, results in the amount of rotation of the motor being dependent upon the total change in quantity of the fuel in the tank. Since this is a rebalancing system the rate of movement of wiper arm 82, which is mechanically driven by motor 94, must be equal to the rate of change of the fuel in tank 65. As is well known, this is because of the time delay between the unbalancing of fuel quantity indicating apparatus 53 and the rotation of motor 94 to rebalance the apparatus. The more the apparatus is unbalanced during the time delay period the faster will be the rotation of motor 94. Thus, the speed of rotation of the motor is proportional to the rate of change of the fuel in the tank. Smaller rate of change of fuel quantity, of course, results in slower rotation of motor 94.

The fuel quantity indicating apparatus 53 just described is described and claimed in an application to Bancroft, Serial No. 181,747, filed August 28, 1950, and assigned to the same assignee as the present invention. Rheostat 60 and potentiometer 62 are for the purpose of balancing the network when there is no fuel in the tank. When tank 65 is empty, the wiper 63 is adjusted until the indicator 95 is at the "Empty" position. Under these conditions, the capacitance of the tank unit 66 multiplied by the voltage across the tank unit is equal to the capacitance of capacitor 87 multiplied by the voltage across capacitor 87. At this time, the current through tank unit 66 is equal to the current through capacitor 87 and wiper arm 82 of potentiometer 81 is at ground potential. Thus, there is no signal from this network to amplifier 72. For calibration for a full tank of fuel, wiper 76 is adjusted with the tank full until the pointer 95 is at the "Full" position and the wiper arm 82 of potentiometer 81 is at the lower end of potentiometer 81. Under these conditions, the capacitance of tank unit 66 multiplied by the voltage across the tank unit is equal to the capacitance of capacitor 84 multiplied by the voltage across this capacitor plus the capacitance of capacitor 87 multiplied by the voltage across capacitor 87. Thus, the current through tank unit 66 is equal to the current through the capacitor 84 plus the current through capacitor 87 and the network is again balanced and there is no signal input to amplifier 72. As can be seen, the signal due to capacitor 87 then balances out the signal due to tank unit 66 when there is no fuel in the tank and the signal from capacitor 84 balances out the signal of tank unit 66 due to the amount of fuel in the tank.

Motor 94 is shown to have a lever 101 which is connected to movable contact 16 of pulsing switch 15 through mechanical connection 102. Thus, rotation of the rotor of motor 94 causes movable contact 16 to alternately make contact with fixed contacts 14 and 20 of switch 15. In a circuit which has been built up the pulsing switch is cycled from about three cycles per second to about twelve cycles per second.

While mechanical connections 102 and 100 are shown coming from motor 94 together it is to be realized that the movement of switch arm 16 is much more rapid than the customarily slow movement of rebalancing wiper arm 82.

When movable contact makes connection with fixed contact 14, capacitors 17 and 23 are connected across a direct voltage source by the following circuit: from the upper terminal of resistor 10 through conductor 103, fixed contact 14, movable contact 16, conductor 104, capacitor 17, capacitor 23 and resistor 24 in parallel, and ground terminals 26 and 13. As resistor 10 and potentiometer 11 are connected in series across battery 12, it is thus seen that there is a direct voltage impressed across resistor 10 which may thus act as a direct voltage source for an additional circuit. When capacitors 17 and 23 are thus connected across a direct voltage source a potential is built up across both capacitors 17 and 23, as well as across resistor 24.

When movable contact 16 is moved downwardly to make connection with fixed contact 20, capacitor 17 is shorted out and the voltage across this capacitor is abruptly reduced to zero voltage. At the same time, however, the voltage across capacitor 23 is discharged through resistor 24. Because of the time constant involved due to the current passing through resistor 24, capacitor 23 is not completely discharged but rather, a voltage remains impressed a cross resistor 24 at the time that movable contact 16 is again moved upwardly to break connection with fixed contact 20 and make connection with fixed contact 14. When movable contact 16 again makes connection with fixed contact 14 a voltage is again impressed across capacitors 17 and 23. Upon movable contact 16 moving downwardly to make connection with fixed contact 20 the capacitor 17 is again shorted out and the voltage there across abruptly falls off to zero while the voltage across capacitor 23 again starts to discharge through resistor 24. This procedure continues until the discharge rate through resistor 24 becomes equal to the charging rate building up the voltage across capacitor 23, at which time the voltage across resistor 24 assumes a relatively constant direct voltage value. If it were not for the inclusion of capacitor 23 the voltage across resistor 24 would be a pulsing direct voltage. The filtering action of capacitor 23 modifies the wave form of the voltage across resistor 24 so that it is essentially saw tooth in shape having from about three to about twelve peaks per second. This variation in value of the voltage is too rapid for pointer 47 on dial 50 to follow and so the pointer is positioned according to the average value of the voltage. Capacitor 23, because of its filtering action, should be much larger than capacitor 17. In a working model which was built up capacitor 17 had a value of .01 microfarad and capacitor 23 had a value of 10 microfarads.

The voltage across resistor 24, as stated previously, is compared with the voltage on wiper 33 of potentiometer 11 which is of the opposite polarity to the voltage across resistor 24. The fact that these two voltages are of opposite polarity is obvious when it is noted that the voltage impressed across capacitors 17 and 23, and thus across resistor 24, is all on one side of ground potential, due to ground terminal 13 being connected at the lower end of resistor 10 while the voltage across potentiometer 11 is on the other side of ground potential, being connected between ground terminal 13 and the lower terminal of battery 12.

The resultant direct voltage due to the combination of voltages from across resistor 24 and from wiper arm 33 of potentiometer 11 is then operated upon by relay 40. Coil 43 of relay 40 is energized from an A. C. source. Once during each cycle, movable contact 41 is moved downwardly to break connection with fixed contact 37. During this portion of the cycle, the direct voltage on conductor 28 is impressed upon capacitor 30 while for the period during the remainder of the cycle movable contact 41 makes connection with fixed contact 37 to ground the resultant voltage to ground terminal 42. Thus, a pulsating direct voltage is impressed on capacitor 30. Capacitor 30 changes this pulsating direct voltage to alternating voltage which is impressed on the input terminals of amplifier 31.

When a voltage difference exists between the voltage across resistor 24 and the voltage on wiper arm 33 of potentiometer 11, amplifier 31 is energized to cause operation of motor 44 which moves pointer 47 along rate indicator dial 50 and also moves wiper arm 33 along potentiometer 11 until the voltage from wiper arm 33 is equal in magnitude though opposite in polarity to the voltage across resistor 24. At this time, the current through resistor 27 is equal to the current through resistor 35 and the input voltage to amplifier 31 is zero, deenergizing the amplifier 31 and motor 44.

If the rate at which fuel leaves tank 65 then changes, a signal of different magnitude will be impressed on the input terminals of amplifier 72 of the fuel quantity apparatus 53 to cause a change in speed of rotation of motor 94, resulting in a change in speed of the charging and discharging cycles of capacitors 17 and 23.

Because capacitor 23 can discharge only so rapidly through resistor 24, a change in the number of charges per unit time delivered to capacitor 23 through capacitor 17 varies the amount of voltage which is impressed across resistor 24 until the charging and discharging currents of capacitor 23 again become equal. Thus, a change in the rate of change of fuel in tank 65 results in a change in the voltage impressed across resistor 24. This change in signal causes energization of amplifier 31 and operation of motor 44 to change the indication on rate indicator dial 50 and also move wiper arm 33 along potentiometer 11 until the network is again balanced.

With increased number of charging and discharging cycles capacitor 23 has built up thereacross a greater and greater voltage. It is thus seen that the amount of additional voltage impressed across capacitor 23 each charging cycle is gradually decreased so that the voltage across resistor 24 is built up nonlinearly until the charging and discharging cycles are equal. The apparatus of Figure 2 eliminates this nonlinearity.

The apparatus of Figure 2 shall now be described.

In the apparatus shown in Figure 2, the components which are the same as the components of the apparatus in Figure 1 are designated by the same numerals. Fuel quantity indicating apparatus 53 has been shown in Figure 2 in block form.

In Figure 2, the resistor 10 and rebalancing potentiometer 11 are again connected across battery 12. The upper terminal of resistor 10 is again connected to fixed contact 14 of pulsing switch 15. The lower terminal of resistor 24 is now, however, connected to wiper arm 33 of potentiometer 11 through conductor 105. The upper terminal of resistor 24 is connected through a single resistor 104 to capacitor 30 and to amplifier 31.

Relay 40 for pulsating the direct voltage, amplifier 31, motor 44 and indicator 50 all remain the same.

In Figure 2, when movable contact 16 is positioned against fixed contact 14, capacitor 17 and filter capacitor 23, in parallel with resistor 24, are connected across the source of voltage by the following circuit; from the upper terminal of resistor 10 through conductor 103, fixed contact 14, movable contact 16, capacitor 17, filter capacitor 23 and resistor 24 in parallel, conductor 105, to wiper arm 33 on potentiometer 11. Thus, there is a voltage on the lower terminal of resistor 24 which is opposite in polarity to the voltage on fixed contact 14 with respect to ground potential. When capacitors 17 and 23 are charged up and movable contact 16 is moved downwardly to make connection with fixed contact 20 capacitor 17 completely discharges while capacitor 23 partially discharges through resistor 24. Capacitor 23 is again charged up when movable contact 16 makes connection with fixed contact 14 and again partially discharges through resistor 24 when movable contact moves downwardly to make connection with fixed contact 20. Thus, it is seen that a voltage is impressed across resistor 24 due to the discharge of capacitor 23 which is in series with a voltage of opposite polarity appearing between wiper arm 33 of potentiometer 11 and ground. When the averages of these two voltages are equal, the upper terminal of resistor 24 is at ground potential and there is then no input signal to amplifier 31. Thus, it is seen that the potential impressed across capacitor 17 is the potential between the upper terminal of resistor 10 and ground terminal, or in other words, the potential across resistor 10. When the network moves off balance so that the potential on the upper terminal of transformer 24 is not at ground potential a signal is impressed on the input circuit of amplifier 31, causing operation of motor 44 and moving wiper arm 33 along potentiometer 11 to vary the potential on the lower terminal of resistor 24 and thus bring the average potential on the upper terminal of resistor 24 back to ground potential. Thus, it is apparent that the voltage across capacitor 17 is at all times approximately equal to the potential across resistor 10. It is therefore apparent that the charging current per cycle of capacitor 17, and thus the charging current per cycle of capacitor 23, is always the same. As a result, complete linearity of the rate indication from this network is assured.

If desired, fuel quantity indicating apparatus 53 may have an output taken from wiper arm 82 along potentiometer 81 and added with outputs from similar networks to obtain a total fuel quantity signal indication. This signal could energize an amplifier to cause operation of a motor and give a dial indication of total fuel quantity. The motor which is operated due to the total fuel quantity signal could drive the movable contact 16 of switch 15 to give a total rate of change of fuel quantity for all of the tanks. It is thus seen that no additional rate indicating apparatus is necessary whether the rate of fuel quantity change is to be for merely one tank of fuel or for all the tanks of fuel in the craft.

It is thus seen that by using an indication from the fuel quantity network, the rate indication is the total rate of fuel quantity change which can be due to engine consumption, evaporation and leakage losses. Further, it is seen that by using a rebalancing type of apparatus there has been eliminated errors which could be due to change in magnitudes of the energizing voltages.

Because modifications may be made by those skilled in the art without departing from the spirit of the in-

I claim as my invention:

1. Measuring apparatus comprising: means responsive to a condition to be measured, means controlled by said means responsive to a condition and operable at a frequency which is a function of the condition to be measured; a source of voltage; a first and a second impedance, at least one of which is a reactive impedance, connected in series across said source of voltage for simultaneous energization of said impedances; switching means connected across one of said impedances, said switching means being controlled by said means controlled by said means responsive to a condition to be measured to cause intermittent operation of said switching means at a frequency which is a function of the condition to be measured and thus controlling the magnitude of the voltage across the other of said impedances; motor means; means controlled by said motor means connected to said source of voltage for obtaining a voltage of varying magnitude and of opposite direction to the voltage across said other impedance; means connected to said motor means and connected to said last named means and said other impedance for comparing said last mentioned voltage with the voltage across said other impedance and deriving a resultant voltage for controlling the operation of said motor means such that said motor means is operated only upon a change in the magnitude of the voltage across said other impedance; an indicator; and means connecting said indicator to said motor means and providing an indication of the frequency of operation of said switching means.

2. Indicating apparatus comprising: a source of voltage; a first and second impedance, at least one of which is a reactive impedance, connected in series across said source of voltage for simultaneous energization of said impedances; intermittently operable switching means connected across one of said impedances, the frequency of operation of said switching means determining the magnitude of the voltage across the other of said impedances; motor means; means controlled by said motor means connected to said source of voltage for obtaining a voltage of varying magnitude and of opposite direction to the voltage across said other impedance; means connected to said motor means and connected to said last named means and said other impedance for comparing said last mentioned voltage with the voltage across said other impedance and deriving a resultant voltage for controlling the operation of said motor means such that said motor means is operated only upon a change in the magnitude of the voltage across said other impedance; an indicator; and means connecting said indicator to said motor means and providing an indication of the frequency of operation of said switching means.

3. Indicating apparatus comprising: a source of voltage; a first and a second impedance, at least one of which is a reactive impedance, connected in series across said source of voltage for simultaneous energization of said impedances; intermittently operable switching means connected across one of said impedances, the frequency of operation of said switching means determining the magnitude of the voltage across the other of said impedances; motor means; means controlled by said motor means connected to said source of voltage for obtaining a voltage of varying magnitude and of opposite direction to the voltage across said other impedance; means connected to said motor means and connected to said last named means and said other impedance adding said last mentioned voltage with the voltage across said other impedance and deriving a resultant voltage for controlling the operation of said motor means such that said motor means is operated only upon a change in the magnitude of the voltage across said other impedance; an indicator; and means connecting said indicator to said motor means and providing an indication of the frequency of operation of said switching means.

References Cited in the file of this patent

UNITED STATES PATENTS

| Number | Name | Date |
|---|---|---|
| 2,060,721 | Bird | Nov. 10, 1936 |
| 2,221,591 | Lansdale | Nov. 12, 1940 |
| 2,354,964 | Ostermann et al. | Aug. 1, 1944 |
| 2,441,632 | Holst | May 18, 1948 |
| 2,476,025 | Clark | July 12, 1949 |
| 2,513,668 | Parker et al. | July 4, 1950 |
| 2,519,416 | Townsend | Aug. 22, 1950 |
| 2,555,491 | Hooven | June 5, 1951 |
| 2,575,494 | Hornfeck | Nov. 20, 1951 |
| 2,653,290 | Hooven | Sept. 22, 1953 |